Feb. 11, 1964  B. J. AWATER ETAL  3,120,693
METHOD AND DEVICE FOR THE MACHINE ASSEMBLING OF
COMPONENT PARTS FOR CRYSTAL DIODES
Filed May 12, 1960  4 Sheets-Sheet 1
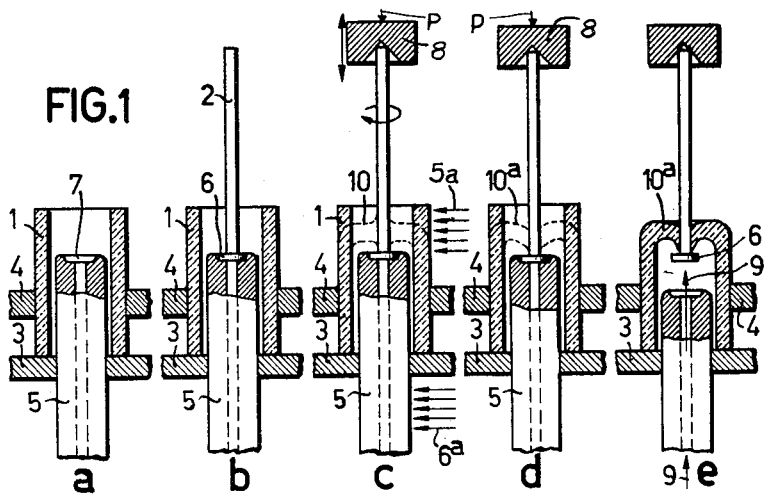
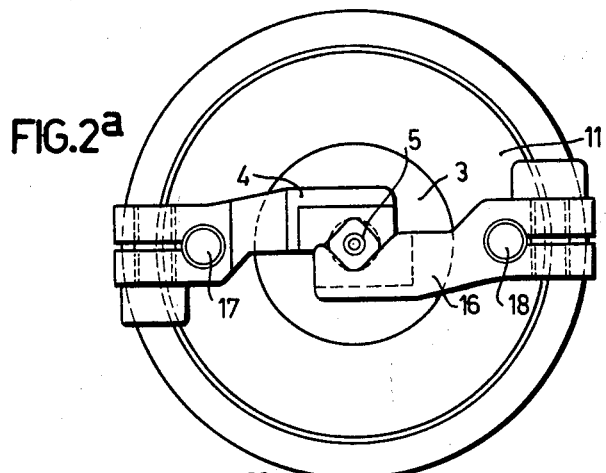
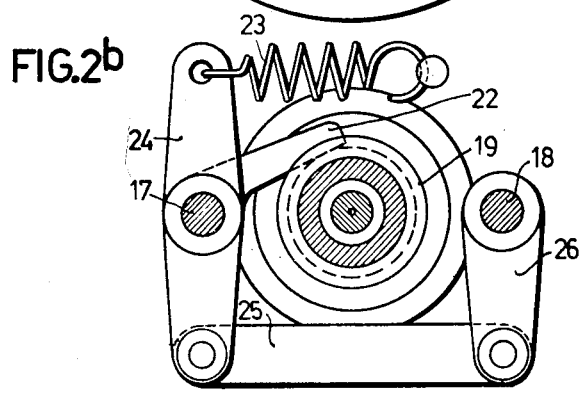
INVENTORS
BERNARDUS J. AWATER
WILHELMUS A. ROOVERS
BY
AGENT Feb. 11, 1964 B. J. AWATER ETAL 3,120,693
METHOD AND DEVICE FOR THE MACHINE ASSEMBLING OF
COMPONENT PARTS FOR CRYSTAL DIODES
Filed May 12, 1960 4 Sheets-Sheet 3

INVENTOR
BERNARDUS J AWATER
WILHELMUS A. ROOVERS

AGENT 3,120,693
METHOD AND DEVICE FOR THE MACHINE ASSEMBLING OF COMPONENT PARTS FOR CRYSTAL DIODES
Bernardus Johannes Awater and Wilhelmus Antonius Roovers, Nijmegen, Netherlands, assignors to North American Philips Company, Inc., New York, N.Y., a corporation of Delaware
Filed May 12, 1960, Ser. No. 28,737
Claims priority, application Netherlands May 12, 1959
6 Claims. (Cl. 29—25.3)

This invention relates to the machine assembling of the cathode portion of crystal diodes which is not yet provided with a crystal. Such cathode portions each comprising a wire or rod and a bulb of glass or the like melted to one end thereof, which bulb partly surrounds the wire or rod, are known as such.

A method and a device for carrying out this method have been sought in which, starting from bare rods or wires and tubes of glass or the like, these parts can be melted together so that, on the one hand, the glass satisfactorily adheres to the rod or wire and, on the other hand, the portion of the rod or wire located inside the wall of the bulb is free from oxidized areas in the ultimate product. In fact, during melting, considerable oxidation of the said portion of the rod or wire occurs. Such oxidized areas, if located inside the surface of the bulb, are to be regarded as undesirable in the ultimate product.

The present invention obviates this disadvantage by means of a method in which a tube of glass or the like is placed on a supporting member and centered in a pair of tongs, a rod or wire having its end provided with a disc is introduced from above into the tube and placed with its flat end on a pin slidable in the supporting member and provided with a bore, the rod or wire being supported at its other end so that it lies substantially at the center of the glass tube and in which subsequently the tube and the rod or wire are set into rotation and one end of the tube is melted to the rod or wire, while after melting together the pin in the supporting member is lowered over a small distance and a reducing gas is supplied through a bore of this pin to the bulb which is now sealed at one side.

The rod or wire and the tube of glass or the like are arranged so that a satisfactory seal may be obtained in a simple manner, while this arrangement is admirably suited for supplying a reducing gas to the portion of the rod or wire surrounded by the bulb at the moment when the sealing operation has just taken place.

In order to obtain a strong connection between the glass and the rod or wire, in one important embodiment of the method according to the invention, the pin is lowered over a small distance during the last phase of the sealing process and prior to the reducing gas being supplied. The tube of glass is then already melted to the rod or wire, but the connection is still so plastic that the rod or wire can be displaced over a small distance in its longitudinal direction with respect to the glass tube towards the portion of the tubular bulb which is still open.

The present invention also provides a device for carrying out the above-mentioned method. A device according to the invention is of the turret-type or the like comprising a plurality of rotary heads located on one pitch circle, each comprising a supporting member and a pair of tongs for the centered holding of a tube of glass or the like, a pin slidable in this supporting member and provided with a bore, the upper end of the pin being provided with a recess for centering one end of a rod or wire to be introduced from above into the tube, this turret also comprising means for moving a glass tube towards each of the sealing heads, means for the centered supporting of the upper ends of rods or wires placed in the heads, means for melting together and means for lowering, according to program, the pin which can slide in the supporting member of each head, it being possible for a reducing gas to be supplied through the bore of the pin after melting together.

The term "or the like" is to be understood to include also an arrangement in which the positions, instead of being located on a circle such as in a turret, are grouped along a different line, for example a more or less straight line. Such a device is preferably designed so that it can be coupled in a simple manner to a transport track over which standard holders can move. Such standard holders are designed so that they can contain component parts manufactured at another place, while a device according to the invention takes the component parts fully automatically, that is to say without any contact by hand, out of these holders and allows them to undergo a treatment to supply them at last, again fully automatically, to these holders which can be moved on the standard transport track to another device for again other treatments.

The method and device according to the invention permit of obtaining, on the one hand, large production numbers per hour and this with very satisfactory and constant outputs and, on the other hand, of manufacturing very constant products substantially independently of the influence of the operating person.

In order that the invention may be readily carried into effect, one embodiment thereof will now be explained in detail, by way of example, with reference to the accompanying drawings, in which:

FIG. 1 shows diagrammatically several stages of the method according to the invention.

Figure 2:
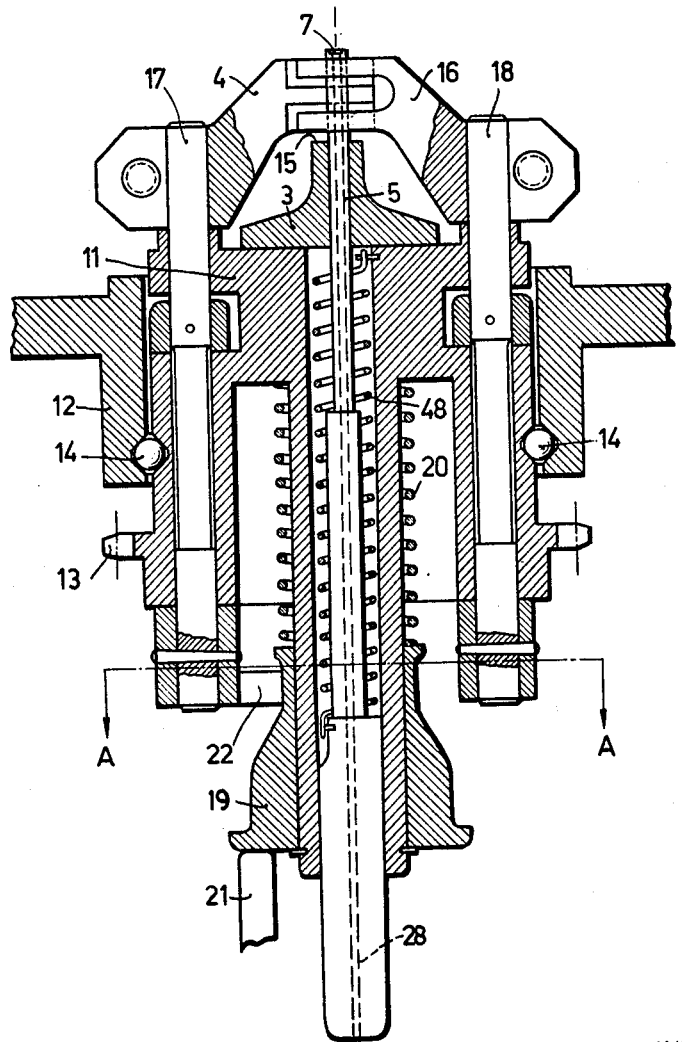
FIG. 2 shows a portion of a device according to the invention, FIG. 2a being a plan view and FIG. 2b a cross-sectional view taken along the line A—A of FIG. 2.

In the method according to the invention (FIG. 1), a glass tube 1 is placed on a supporting member 3 and centered by means of a member 4 preferably having the form of a pair of tongs (FIG. 1a). Subsequently, a rod or wire 2, provided with a thin disc 6, is introduced from above into the glass tube 1 (FIG. 1b) and centered, at its end 6, in a recess 7 substantially matched to the disc 6 and provided in a pin 5 which is arranged in the supporting member 3. The other end of the said rod is supported in a member 8 (FIG. 1c), while in this situation a force P is exerted in the direction of the length of the rod or wire. Subsequently, the tube 1 and the rod or wire 2 are set into rotation, the wire 2 and the glass tube 1 being melted together while supplying heat as indicated by 5a (FIG. 1c). Due to this mode of arrangement, heat can also be supplied in a simple manner, as indicated by 6a in FIG. 1c, to the pin 5, so that cooling of the upper end of the pin is prevented. It has been found that this has a very favourable effect upon the quality of the seal between the glass tube and the rod or wire.

If the heat is supplied by means of burners, the metal rod has been subject to strong oxidation as a result of the sealing operation. Since this is highly objectionable for the ultimate product and especially for those oxidized areas which are located inside the sealed bulb, the oxidation can be obviated again by lowering the pin 5, provided with a bore, over a small distance. Consequently, the recess 7 becomes clear of the wire 2 and a reducing gas as indicated by 9 can be supplied to the bulb which is now sealed at one side and provided with a wire (FIG. 1e).

In one important embodiment of the method according to the invention, the pin 5 is lowered over a small distance during the last phase of the sealing process and prior to the reducing gas being supplied. During this phase, a connection as indicated by 16 has already been established. However, the glass is then still so soft that, when the pin 5 is slightly lowered, the rod or wire 2 follows the movement of the pin 5 due to the force P exerted upon it, until the disc 6 again bears in the recess 7. The seal thus acquires a shape as indicated by 10a in FIG. 1d. The shape 10a affords great advantages in further working the cathode portions to form diodes, since it results in a stronger connection between the glass and the wire than in the case of a shape 10.

Figure 3:
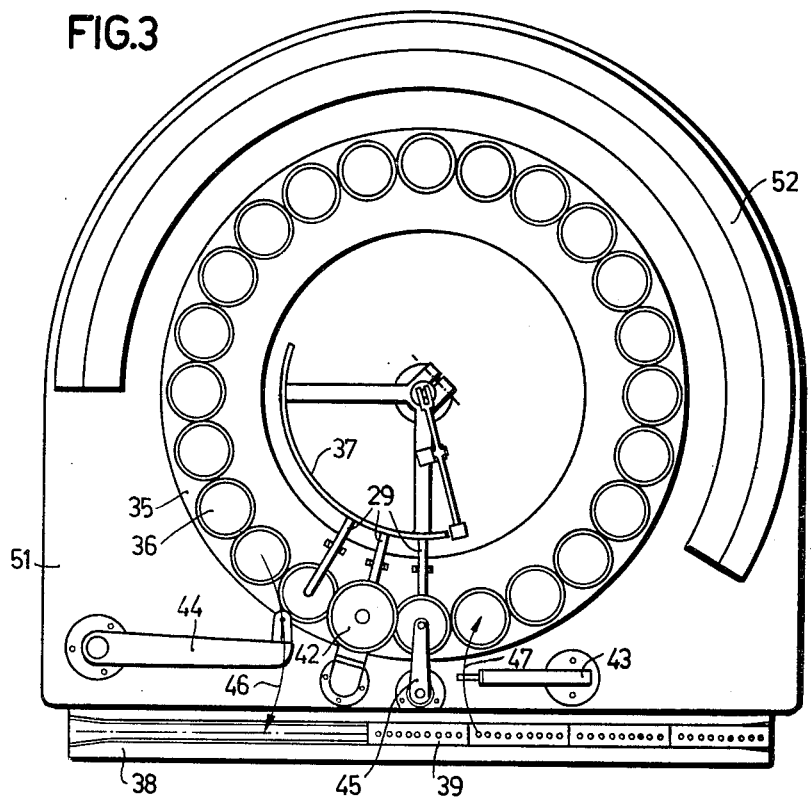
FIGS. 3 and 4 show diagrammatically a plan view and a side view, respectively, of a turret comprising a plurality of sealing heads as shown in FIG. 2.

One advantageous embodiment of a device according to the invention is shown in FIGS. 2 and 3, in which a body 11 can rotate in a portion 12, which in itself is at rest, by means of a toothed rim 13 via balls 14. Rigidly connected to the body 11 is the supporting member 3, on the top of which, indicated by 15, a glass tube can be disposed and centered by means of a pair of tongs comprising parts 4 and 16. The part 16 is partly fork-shaped. The following may serve to clarify the movement of the tongs. The parts of the tongs are pivotally arranged in the body 11 by means of shafts 17 and 18. Their movement is brought about by displacement of a sleeve 19 by means of a cam 21. When the sleeve 19 is displaced upwards, a lever 22 connected to the shaft 17 is moved over the conical portion of sleeve 19 and an angular displacement of the shaft 17 can be brought about. As a result thereof and due to the presence of coupling pieces 24, 25, 26, the shaft 18 is also somewhat rotated, the parts 4 and 16 of the tongs thus being moved apart against the action of a pull spring 23. After a glass tube has been placed on the supporting member 3, the cam 21 is again moved downwards and the tongs are closed due to the action of the said spring 23, the tongs clamping the glass tube in position at three points located in the direction of length of this tube and centering it in a manner similar for each tube.

The upper end of the pin 5, which is slidable in the body 11, is provided with a recess 7 for the centered supporting of a rod or wire having its end provided with a thin disc, the pin 5 also being provided with a central bore 28. The pin 5 can be lowered, according to program, over a small distance in a manner not shown, the connection between the bore 28 and a system of pipe lines, otherwise not shown, being such that a reducing gas is supplied through this bore to the recess 7 during the period in which the pin 5 is at its lowest position. The pin 5, together with the body 11, can rotate due to the lower and the upper end of a spring 48 being secured to the pin 5 and the body 11, respectively.

For the centered holding of the other end of a rod or wire placed at its flat end in the recess 27, provision is made of a movable arm 29 which can pivot about a shaft 32 and which is provided with a supporting block 8 and a spring plate 31. The movement of the arm 29 is controlled so that the positions of the arm 29 indicated in dotted line and in full line are the extreme positions to which this arm can be commanded. The structure is such that, during the movement of the arm 29 to its lower position, the arm only centers the rod or wire 2, while the spring plate 31 urges the rod or wire 2 into the recess 27 of the shaft 5 with a force determined by the spring plate. Due to this step, the inertia action of the arm 29 exerted upon the end of the rod or wire during the downward movement is substantially suppressed. It has also been found that, when the glass tube and the rod or wire are set into rotation, it is not necessary to cause the supporting block 30 to follow this rotation. In fact, the force with which the spring plate 31 maintains the rod or wire in the recess 7 is so small that the friction which occurs due to the rotation of the rod or wire at the contact area between the stationary spring plate and the rotary rod or wire may be considered as negligible.

Figure 4:
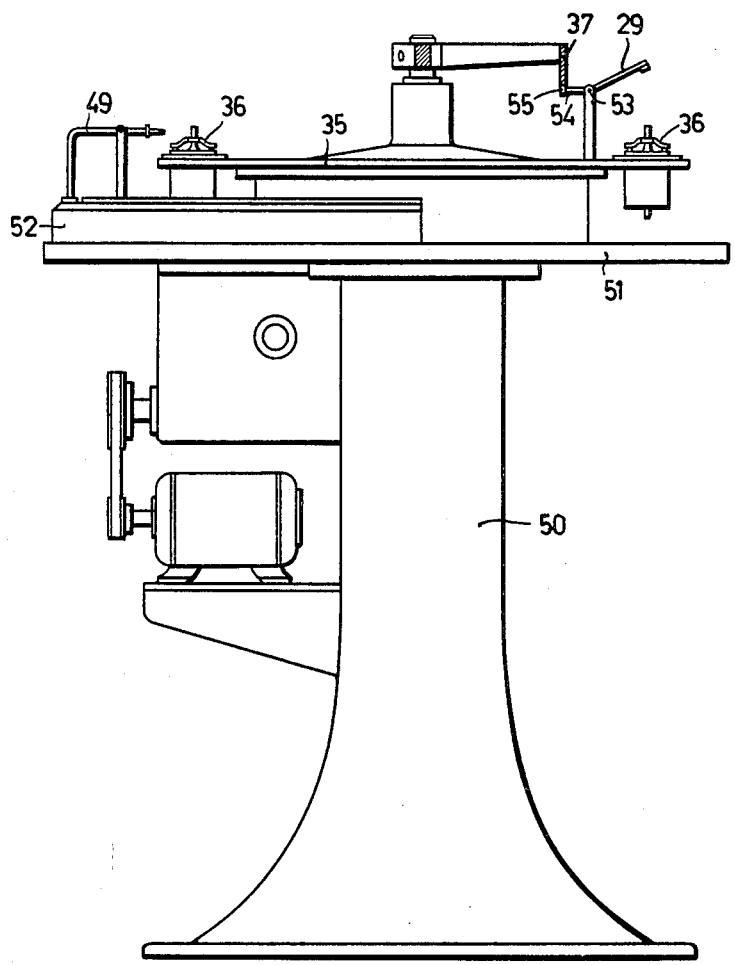

In conclusion, FIGS. 3 and 4 show a device comprising a plurality of sealing heads of the type previously described. The device is of the turret type in which all of the sealing heads 36 are grouped on one pitch circle. The sealing heads are located on a rotary table 35 which can rotate in a stepwise manner with respect to a frame 50.

In addition, a plurality of arms 29 are provided, three of which are shown in FIG. 3. One arm 29 is associated with each sealing head 36. The arms 29 are normally in approximately horizontal positions, their ends thus bearing on the upper end of the wire or rod in each sealing head. Each arm can be tilted upwards due to the presence of a lever 54 rigidly connected to arm 29, which lever 54 is pivoted at point 53 and provided with a roller 55. Rolling over a cam roller track 37, the arm 29 of each sealing head is moved to the desired position due to the slope of this track.

The periphery of the rotary table 35 is provided with a segment 52 which is rigidly connected via a base plate 51 to the frame 50. A plurality of burners 49 are mounted on the segment 52. Burners 49 can supply heat to the sealing heads over the portion of the circumference of the turret surrounded by the segment 52 during the period in which the table 35 is not turned.

Figure 5:
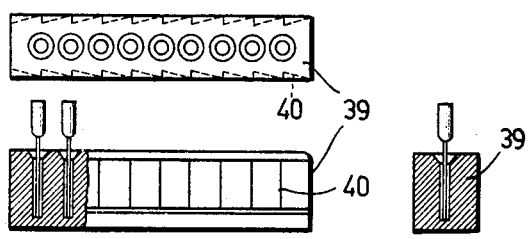
FIG. 5 shows a transport holder on an enlarged scale.

The whole of the device above described is connected to a guide track 38 in which transport holders 39 provided with teeth 40 (FIG. 5) can be supplied and carried off. The holders 39 have a plurality of apertures for vertically placing and transporting in them rods or wires which are straight per se, the teeth provided on their side flanks being such that the number of teeth corresponds to the number of apertures in a holder. When placed in the guide track 38, a driving ratchet mechanism can displace the holders on this track so that each time the turret is turned a position further, the holders also move on one tooth. In synchronism with the transport movement of these holders there are provided take-over members 43 and 44. The member 43 serves to take the wires out of the holders and to move them to the sealing heads according to path 47, the finished product being taken out of the machine and placed in a holder according to path 46 by means of the member 44. Likewise synchronized with the rotational movement of the turret is a member 42 for the supply of glass tubes to the sealing heads. Finally, a member 45 is provided for scanning the sealing heads, in order to determine whether certain parts are still present in the sealing heads at the moment when the area where the member 44 takes the products out of the machine has been passed by the sealing heads. If any parts have remained in the heads, a blocking device is controlled electromagnetically by the member 45 in a manner such that a sealing head in which parts have remained, has no glass supplied to it at the position where the member 42 is active, while no rod nor wire is supplied at the position where the member 43 is active.

What is claimed is:

1. A method of assembling an electrode for an electronic device comprising; placing a glass tube on a supporting member, centering said tube in a pair of tongs, introducing a rod with a disc at one end into said tube from above, sliding a pin from below up into said supporting member, said pin having a bore and a counterbore, placing the disc at the end of the rod in said counterbore, rotating both said glass tube and rod, sealing one end of said glass tube to said rod, lowering said pin a small distance after said glass tube and rod are melted together, and thereafter supplying a reducing gas through the bore of said pin to the sealing area thereby forming a gastight seal between said rod and said glass tube.

2. A method of assembling an electrode for an electronic device as claimed in claim 1 wherein said pin is lowered a small distance during the last phase of the sealing process and prior to the supply of said reducing gas.

3. Apparatus for assembling an electrode for an electronic device including a rod in a glass tube comprising a turret having a plurality of rotary heads arranged circularly, each head comprising a supporting member and a pair of tongs, said supporting member and tongs holding and centering said glass tube, a pin slidable in said supporting member, said pin being provided with a bore and at its upper end with a recess for centering one end of said rod, a movable arm on said turret for inserting a glass tube in each of said sealing heads, for melting said glass tube to said rod, and means for lowering, according to program, the pin slidable in a corresponding supporting member, reducing gas being supplied through the bore of said pin after said rod and said glass tube have been melted together.

4. Apparatus for assembling an electrode for an electronic device including a rod in a glass tube as claimed in claim 3 further comprising a transport track, a holder on said track for supplying said cathode rod, and means for removing said rod from its holder and placing a rod end in the recess of the bore of said pin, and a device for removing the sealed cathode from said turret and placing it in the holder on said track.

5. Apparatus for assembling a cathode including a rod for a crystal diode in a glass tube comprising a turret having a plurality of rotary heads arranged circularly, each comprising a supporting member and a pair of tongs, said supporting member and tongs holding and centering said glass tube, a pin slidable in said supporting member, said pin being provided with a bore and at its upper end with a recess for centering one end of said rod, a movable arm on said turret for inserting a glass tube in each of said sealing heads, means for melting said glass tube to said rod, means for lowering, according to program, the pin slidable in a corresponding supporting member, reducing gas being supplied through the bore of said pin after said rod and said glass tube have been melted together, and a limited motion arm provided with a recess for engaging and centering said rod.

6. Apparatus for assembling a cathode including a rod for a crystal diode in a glass tube comprising a turret having a plurality of rotary heads arranged circularly, each comprising a supporting member and a pair of tongs, said supporting member and tongs holding and centering said glass tube, a pin slidable in said supporting member, said pin being provided with a bore and at its upper end with a recess for centering one end of said rod, means on said turret for inserting a glass tube in each of said sealing heads, means for melting said glass tube to said rod and means for lowering, according to program, the rod slidable in a corresponding supporting member, reducing gas being supplied through the bore of said pin after said rod and said glass tube have been melted together, a limited motion arm being provided with a bore for the centered supporting of the upper end of said rod, and a spring mounted on said arm for urging said rod in the direction of its length and one end of said rod into the recess of said pin.

References Cited in the file of this patent

UNITED STATES PATENTS

| | | |
|---|---|---|
| 2,595,058 | Daley | Apr. 29, 1952 |
| 2,693,555 | North et al. | Nov. 2, 1954 |
| 2,856,571 | Holzeman | Oct. 14, 1958 |
| 2,869,056 | Roovers et al. | Jan. 13, 1959 |
| 2,961,800 | Bates | Nov. 29, 1960 |

FOREIGN PATENTS

| | | |
|---|---|---|
| 1,167,971 | France | Dec. 3, 1958 |

UNITED STATES PATENT OFFICE
CERTIFICATE OF CORRECTION

Patent No. 3,120,693                                            February 11, 1964

Bernardus Johannes Awater et al.

It is hereby certified that error appears in the above numbered patent requiring correction and that the said Letters Patent should read as corrected below.

Column 5, line 11, after "heads," insert -- means --.

Signed and sealed this 30th day of June 1964.

(SEAL)
Attest:

ERNEST W. SWIDER                                            EDWARD J. BRENNER
Attesting Officer                                               Commissioner of Patents